US007529386B2

(12) United States Patent
Denzer et al.

(10) Patent No.: US 7,529,386 B2
(45) Date of Patent: May 5, 2009

(54) METHOD AND DEVICE FOR MONITORING STAMPS ON MAIL

(75) Inventors: Rudi Denzer, Bonn (DE); Carsten Vullriede, Hodenhagen (DE); Jörg Diefenbach, Bickenbach (DE)

(73) Assignee: Deutsche Post AG, Bonn (DE)

( * ) Notice: Subject to any disclaimer, the term of this patent is extended or adjusted under 35 U.S.C. 154(b) by 1016 days.

(21) Appl. No.: 10/467,037

(22) PCT Filed: Jan. 23, 2002

(86) PCT No.: PCT/DE02/00216

§ 371 (c)(1), (2), (4) Date: Jan. 5, 2004

(87) PCT Pub. No.: WO02/061695

PCT Pub. Date: Aug. 8, 2002

(65) Prior Publication Data

US 2004/0096081 A1 May 20, 2004

(30) Foreign Application Priority Data

Feb. 2, 2001 (DE) ................................ 101 05 273

(51) Int. Cl.
*G06K 9/00* (2006.01)

(52) U.S. Cl. ...................................... 382/101; 382/102

(58) Field of Classification Search .......... 382/101-102
See application file for complete search history.

(56) References Cited

U.S. PATENT DOCUMENTS

| | | | | |
|---|---|---|---|---|
| 3,488,511 | A | 1/1970 | Mori et al. | 250/226 |
| 5,535,127 | A | 7/1996 | Uno et al. | 364/464.02 |
| 5,586,036 | A * | 12/1996 | Pintsov | 705/408 |
| 5,719,948 | A | 2/1998 | Liang | 382/112 |
| 5,917,925 | A * | 6/1999 | Moore | 382/101 |
| 5,943,432 | A | 8/1999 | Gilmore et al. | 382/101 |
| 5,960,103 | A | 9/1999 | Graves et al. | 382/135 |
| 5,992,601 | A | 11/1999 | Mennie et al. | 194/207 |
| 6,039,257 | A * | 3/2000 | Berson et al. | 235/468 |

FOREIGN PATENT DOCUMENTS

| | | | |
|---|---|---|---|
| EP | 294 497 | B1 | 12/1988 |
| EP | 373 972 | B1 | 6/1990 |

(Continued)

OTHER PUBLICATIONS

International Search Report in PCT/DE02/00216 dated Jun. 16, 2003.

(Continued)

*Primary Examiner*—Wesley Tucker
(74) *Attorney, Agent, or Firm*—Marshall, Gerstein & Borun LLP

(57) ABSTRACT

The invention relates to a method for monitoring postage indicia on mail items. According to the invention, graphic information is captured in at least one selected read area of the mail, whereupon the stored graphic information is compared to the graphic representation of the postage indicia. If the graphic information does not match one of the stored images, said mail is subjected to another monitoring step. The invention also relates to a device which is suitable for carrying out the inventive method.

10 Claims, 3 Drawing Sheets

FOREIGN PATENT DOCUMENTS

| | | | |
|---|---|---|---|
| JP | 59-131189 | | 7/1984 |
| JP | 07-035570 | | 2/1995 |
| RU | 2 054 338 | C1 | 2/1996 |
| RU | 15040 | | 9/2000 |
| RU | 2 158 443 | C1 | 10/2000 |
| WO | WO 91/11703 | | 8/1991 |
| WO | WO 94/06102 | | 3/1994 |
| WO | WO 99/38700 | | 8/1999 |

OTHER PUBLICATIONS

International Preliminary Examination Report in PCT/DE02/00216 dated Sep. 4, 2003.

*Noviy Enciklopedicheskiy Slovar*. Moscow. p. 597, 686 (2001).

* cited by examiner

METHOD AND DEVICE FOR MONITORING STAMPS ON MAIL

This is the U.S. national phase of International Application No. PCT/DE02/00216 filed Jan. 23, 2002, the entire disclosure of which is incorporated herein by reference.

BACKGROUND OF THE INVENTION

1. Field of the Invention

The invention relates to a method for checking postage indicia applied onto mailpieces.

The invention also relates to a device that is suited for executing the method.

2. Related Technology

International patent application WO 99/38700 discloses a method for checking the genuineness of documents having a value. In this method, emission lines that lie within the infrared spectral range are examined. Here, the genuineness of the documents having a value is substantiated by the presence of specific emission lines.

SUMMARY OF THE INVENTION

The invention is based on the objective of improving a method of the generic type in such a way that postage indicia applied onto mailpieces can be checked quickly and reliably. In particular, a method is to be provided that allows checking of a large number of postage indicia applied onto mailpieces.

According to the invention, this objective is achieved in that, in at least one selected reading area of the mailpiece, graphic information is detected, in that subsequently, the detected graphic information is compared to stored representations of postage indicia and in that the result of the comparison is evaluated.

The process according to the invention preferably comprises two partial steps. Advantageously, at least one of the two partial steps comprises a detection procedure to see whether the postage indicium matches a prescribed graphic symbol. Preferably, at least one further checking step involves checking whether a security feature is present.

An advantageous embodiment of the method provides that, if the graphic information matches one of the stored depictions of the postage indicia, the mailpiece is subjected to a further checking step in order to ascertain whether a security feature is present.

Moreover, even if the graphic information matches one of the stored depictions of the postage indicia, it is advantageous for the mailpiece to be subjected to a further checking step.

Another advantageous embodiment of the invention provides that, if the graphic information does not match one of the stored depictions of the postage indicia, the mailpiece is subjected to a further checking step.

An especially secure and reliable checking of the genuineness of the postage indicia is advantageously achieved in that the further checking step comprises irradiation with light.

Here, it is especially advantageous to check whether the irradiation with light takes place in the selected reading area.

In an especially preferred embodiment of the invention, the method is carried out in such a way as to detect whether the irradiation with light has caused fluorescence.

Furthermore, it is advantageous for the graphic information in the selected reading area to be detected with a sensor.

It is likewise advantageous for the graphic information to be detected by a camera.

An embodiment of the invention that is especially preferred because of the speed of the checking procedure is characterized by the fact that the graphic information is detected in a symbol recognition unit (ACR—Advanced Color Recognizer).

Moreover, it is advantageous for the graphic representations of postage indicia to be stored in a memory of a data processing unit before the detection of the graphic information.

The invention also provides for configuring a device for checking postage indicia applied onto mailpieces in such a way that the device has a means for detecting graphic information in at least one area of the mailpiece, that the device comprises a means for comparing the graphic information with graphic reproductions of postage indicia, that the device comprises a means for checking the presence of at least one security feature, that the device comprises a means for selecting the means for checking the presence of the security feature and that, if the security feature is not present, the mailpiece is rejected.

Further advantages, special features and practical improvements of the invention ensue from the subordinate claims and from the presentation below of preferred embodiments of the invention with reference being made to the drawing.

DETAILED DESCRIPTION

Below, the invention will be explained with reference to checking postage indicia applied onto mailpieces in a positioning machine. The execution of at least one of the components of the checking method in a positioning machine is preferred since the surface of the mailpiece is especially readily accessible in the positioning machine.

However, the postage indicium can also be checked in other places. Preferably, these places for checking are located in mail or freight centers. Here, it is especially advantageous for one or more of the components to be checked in sorting and distribution machines.

Integrating one or more components of the method for checking postage indicia in sorting and distribution machines has the advantage that, as a result, the method for checking can be carried out especially quickly and at high throughput rates.

Figure 1:
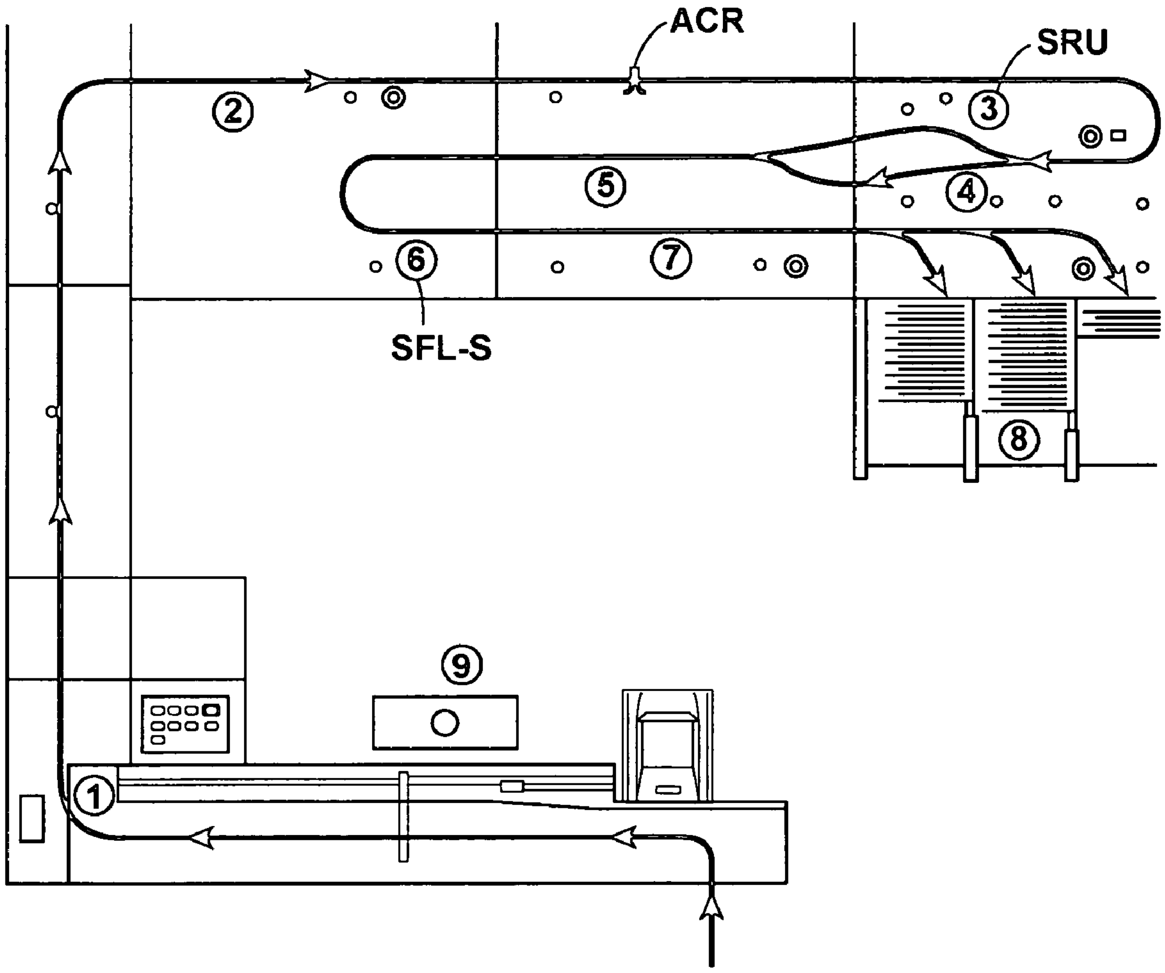
FIG. 1 schematic representation of a positioning machine equipped for ecuting the method according to the invention, FIG. 2 a schematic representation of the path of a mailpiece with a postage indicium that is to be cheeked and FIG. 3 a schematic representation of checking steps and further process steps.

FIG. 1 shows a positioning machine that is suitable for the execution of the invention.

The positioning machine comprises an intake site 1 for the mailpieces, a conveyance section 2, a symbol recognition unit ACR, a means 3 for detecting the presence of a postage indicium, in the simplest case a postage stamp, a turning section 4 and another conveyance section 5 downstream from the turning section 4.

Another means 6 for checking whether another security feature is present is preferably located at the place marked with the reference numeral 6.

Over the course of a conveyance section of the mailpieces, there is a stamping device 7 and stacking pigeonholes 8 situated downstream from the further means for checking the further security feature.

The system is preferably controlled by a suitable digital circuit 9.

The positioning machine comprises a sensor for detecting graphic information applied onto the surface of mailpieces.

In the description of the preferred embodiments given below, especially preferred means for executing functions according to the invention are shown. If necessary, the person skilled in the art can replace these by means having equivalent functions, for example, optical sensors can be replaced by cameras.

The sensor is a component of a symbol recognition unit (ACR). Here, the sensor S is preferably connected to a data processing unit, for example, via a data line that forwards graphic information to other components of the symbol recognition unit.

The symbol recognition unit ACR is preferably configured in such a way that it recognizes graphic symbols and associates them with graphic characters. This is why it is referred to as an Advanced Color Recognizer.

The symbol recognition unit ACR is connected to a data processing unit, and the data processing unit allows and/or supports a comparison of the graphic information with the stored representations of postage indicia.

The symbol recognition unit can be connected to a computer. It is possible to equip the symbol recognition unit with its own computer. Particularly in large checking centers for postage indicia, for example, in mail centers, however, it is advantageous for several symbol recognition units to be connected to a central computer.

The term "computer" is not to be construed in any limiting manner. It can be any unit that is capable of performing computations, for example, a work station, a personal computer, a microcomputer or a circuit that is suitable for performing calculations and/or comparisons.

The use of a central computer for several symbol recognition units is especially advantageous since this allows the intake of new postage indicia, for example, new postage stamps, for several devices in one single processing step.

However, by the same token, the symbol recognition units of several mail centers can be networked with a central computer that works for several mail centers. In this manner, a checking center can assume the checking tasks for several mail or freight centers. For example, a postal service provider can operate a central computer for several, preferably for all mail and/or freight centers.

The computer contains a database with a learning system for purposes of learning symbols. These symbols are preferably graphic representations of postage stamps or other postage indicia. Preferably, a freely selectable subset is generated as the current database from a full set of data contained in the database.

When the database is used, it is advantageous for information about the postage indicia and/or process instructions to be transmitted to the individual devices. Such process instructions are preferably automated processing schemes or program routines that preferably control one or more functions of the device for purposes of checking the postage indicia.

Figure 2:
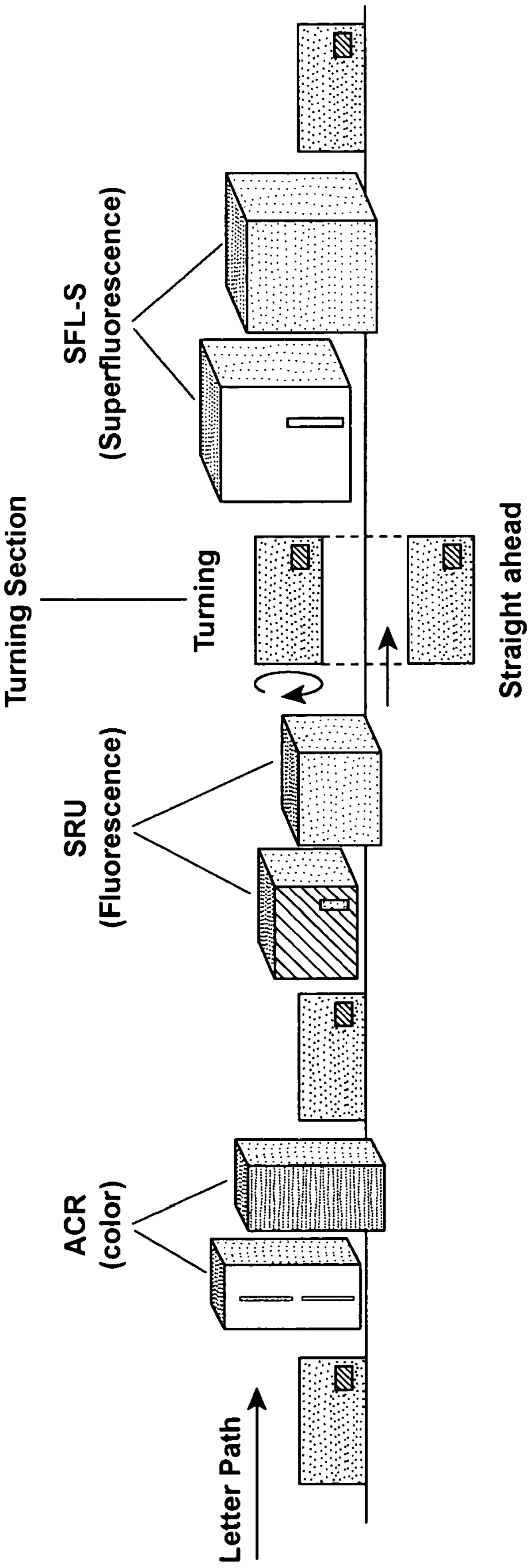
Figure 3:
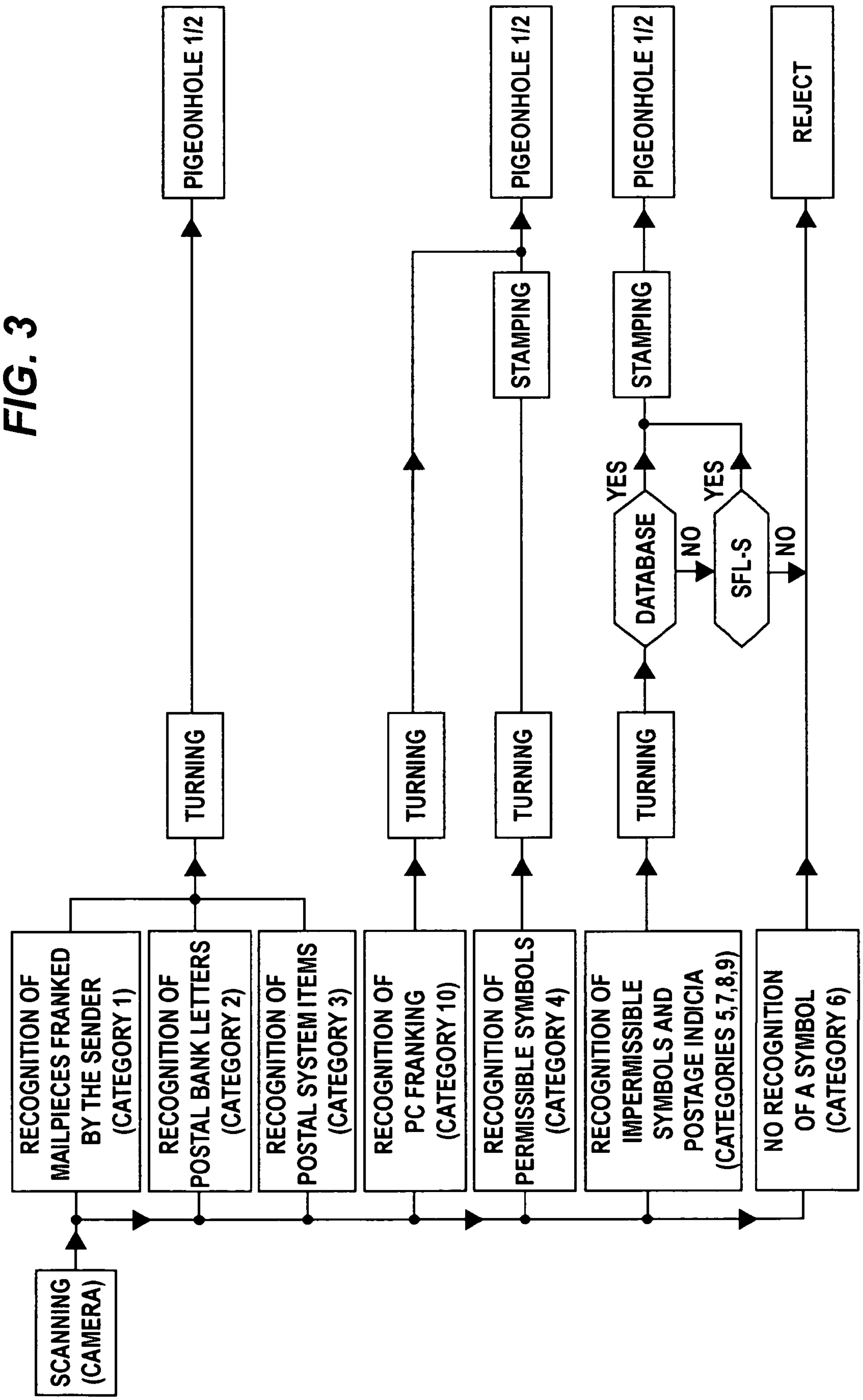

A schematic representation of a preferred arrangement of means for checking the postage indicia is shown in FIG. 2.

The checking device presented comprises a symbol recognition unit ACR that is connected to a data processing unit (now shown here). The symbol recognition unit preferably comprises one or more sensors that evaluate color information, especially local distributions of color information, and compare them with prescribed symbols.

Preferably, the symbol recognition unit serves to recognize prescribed postage indicia, especially postage stamps.

Although it is possible to connect a symbol recognition unit to a data processing unit, it is even more advantageous to connect several symbol recognition units ACR to one or more central data processing units. The central data processing unit preferably comprises a database with an expandable data memory containing information for recognizing symbols so that the recognition rate can be further improved by evaluating preceding executions of the checking procedure.

The device for checking the postage indicia also comprises at least one means for checking the presence of a security feature.

A first means for checking the presence of a postage indicium, especially a stamp, is referred to as SRU, whereby the abbreviation SRU indicates that, in the simplest case, this device is a Stamp Recognition Unit that checks the presence of a stamp and/or that ascertains the position of the stamp.

The checking device designated as SRU is, for example, a fluorescence sensor. Preferably, a light source is arranged in such a way that it systematically irradiates the surface of the mailpiece or a selected area of the surface of the mailpiece in such a way that areas applied onto the mailpiece and provided with a fluorescing agent are excited to fluoresce. This fluorescence is detected by the fluorescence sensor.

The fluorescence sensor is preferably coupled to a first means that enables the device to change the path of a letter.

The further checking procedure and/or the further path of the letter can be varied as a function of the result of the examination with the SRU means that serves to check the presence of a postage indicium.

Thus, for example, mailpieces that have no fluorescence can be rejected from the letter path.

Moreover, it is advantageous to check the presence of one or more security features. Fundamentally, the presence of a fluorescent dye can already be checked as a security feature.

In order to achieve greater protection against forgery, it is advantageous to use the presence of a fluorescent dye only as a means to determine the position of a postage indicium and, instead, to check the presence of other security features when the genuineness is to be checked.

In the particularly advantageous case being presented here, a superfluorescence sensor serves as the means for checking the presence of the security feature.

The superfluorescence sensor shown utilizes a physical effect that had not yet been used so far for checking indicia in order to ascertain the genuineness of the postage indicia.

This effect is an anti-Stokes effect. The anti-Stokes effect comprises irradiating the postage indicia to be checked with low-energy electromagnetic radiation having a high intensity, exciting a fluorescence of higher-energy electromagnetic radiation and the subsequent detection of the higher-energy electric radiation.

This effect differs from the known examination using fluorescence since, with the known examination methods, irradiation of the sample is carried out with higher-energy radiation (for example, UV light) while the subsequent emission involves low-energy radiation (for example, visible light).

In the especially preferred embodiment shown, the symbol recognition unit ACR controls a turning device. Preferably, the turning device positions a surface, preferably the surface area containing the first security feature, in an area in which it can be checked for the presence of the security feature.

Although a second security feature can comprise a wide array of features, such as, for example, watermarks, the use of a superfluorescence sensor is especially advantageous.

Preferably, the superfluorescence sensor is configured in such a way that it can analyze a spectral distribution of the electromagnetic radiation it has received.

Preferably, the superfluorescence sensor also determines especially the radiation intensity within a selected spectral range. In this manner, the superfluorescence sensor can be adapted to the emission behavior of the superfluorescent dye used for the production of the postage indicia.

Such an adaptation is especially advantageous, since, for energy-related reasons, the effect of the superfluorescence is generally weaker than conventional fluorescence.

Using the device described, a checking procedure is carried out as follows:

Mailpieces MP are first carried along a first prescribed letter path to the first means ACR for checking the presence of stored graphic information.

Depending on the result of the check as to whether a prescribed graphic symbol is recognized, the letter path is changed and/or the operation of one or more means for checking the presence of a security feature is effectuated.

In the particularly preferred case presented here, irradiation of the mailpiece, or of the area of the graphic symbol applied to the mailpiece, with light, especially UV light, serves to check whether the mailpiece, or especially the surface area of the mailpiece to which a postage stamp or another symbol displaying fluorescence has been applied, contains a fluorescent dye.

The mailpieces MP that have a graphic symbol that matches a valid postage indicium and/or fluorescence are conveyed to a superfluorescence sensor.

Preferably, it is checked whether, in the surface area that contains a conventional fluorescent dye, there is also a superfluorescence containing a superfluorescent dye.

In the vicinity of the second SFL S means used to check the presence of another security feature, it is checked whether superfluorescence is present. In order to check the presence of superfluorescence, it is checked whether higher-energy radiation is emitted.

For example, after a preceding irradiation with infrared light, it is checked whether visible light is emitted. As an alternative, for example, after irradiation with visible light, it is checked whether light within the UV range is emitted. Advantageously, here a spectral distribution of the light emitted from the area of the mailpiece is examined and/or it is checked whether this light contains spectral components having a predefined wavelength and intensity.

Since substances, especially dyes with components of rare earth atoms, that have one or more discrete fluorescence lines are used for the production of forgery-proof superfluorescent dye, it is possible in this manner to recognize whether a genuine superfluorescent dye is present.

The above-mentioned means for checking security features can be replaced by means that fulfill the same function.

Moreover, at suitable places in the device, it is advantageous to create possibilities to reject mailpieces on which one or more of the security features are not found and/or that do not contain a prescribed graphic symbol as a postage indicium.

It is especially advantageous to classify the checked mailpieces in various categories.

Here, predefined as well as freely selectable categories can be used.

Preferred examples of the categories are mailpieces franked by the sender (hereinafter referred to as Category 1), postal bank letters (hereinafter referred to as Category 2), postal system items (hereinafter referred to as Category 3), mailpieces with permissible symbols (hereinafter referred to as Category 4), mailpieces with impermissible symbols (Category 5), mailpieces without symbols (Category 6), mailpieces with invalid postage indicia not contained in the database (Category 7), mailpieces with invalid postage indicia and symbols that are similar to postage indicia that are contained in the database (Category 8), mailpieces with postage indicia that are invalid at times (Category 9), mailpieces with digital postage indicia (PC franking) (Category 10).

In checking the postage indicia applied on the mailpieces, first of all, it is checked whether these are mailpieces franked by the sender. These—if applicable, after being turned—are conveyed into one or more pigeonholes for permissible mailpieces. Moreover, mailpieces that are permitted to be carried without charge such as postal bank letters or postal system items are recognized and—if applicable, after being turned—are transported into a pigeonhole for permissible mailpieces.

Then—for example, by checking for the presence of a one-dimensional or two-dimensional bar code, it is ascertained whether it is a mailpiece provided with a digital franking marking.

Mailpieces with permissible symbols—if applicable, after being turned—are stamped and likewise conveyed into a pigeonhole for permissible mail.

If impermissible symbols are recognized, it is advantageous to check whether, in spite of the recognition of an impermissible symbol, it is a legitimately generated postage indicium.

For example, it is checked here whether the symbols that were detected as being impermissible are postage indicia of mailpieces assigned to one of the Categories 5, 7, 8 or 9. For this purpose, for instance, it is checked whether the symbols are contained in a database. Here, for example, mailpieces are recognized on which at least one prescribed surface section of the postage indicium, or of the symbol, is situated in a postage indicium zone.

Symbols that are not contained in the database are conveyed to the SFL S means to be checked for the presence of a second security feature. If the second security feature is present, then the mailpieces, like the mailpieces previously recognized in the database as being valid, are stamped and conveyed into a pigeonhole for permissible mailpieces.

Additional mailpieces, especially mailpieces that contain no symbols, are rejected from the device and conveyed into a pigeonhole for impermissible mailpieces that bears the designation "reject".

LIST OF REFERENCE NUMERALS

ACR symbol recognition unit
SRU first means to check a first security feature
MP mailpiece
S sensor
SFL-S second means to check a second security feature
IEP means for checking for secret information
1 intake site
2 conveyance section
3 first means (SRU)
4 turning section
5 further conveyance section
6 further means (SFL-S)
7 stamping means
8 stacking pigeonholes
9 digital circuit

The invention claimed is:

1. A method for checking a postage indicium applied onto a mailpiece, comprising:

detecting graphic information in at least one selected reading area of the mailpiece by a symbol recognition unit;

subsequently comparing the detected graphic information to stored representations of postage indicia;

evaluating the results of the comparison;

when impermissible symbols are recognized, a first device for checking the presence of a security feature checking whether, in spite of the recognition of an impermissible symbol, a legitimately generated postage indicium is present, and for this purpose, checking whether the symbols are contained in a database;

stamping and conveying mailpieces that have been recognized as being valid into a compartment for permissible mailpieces;

conveying symbols that are not contained in the database to a second device for checking the presence of a second security feature, wherein checking for the presence of a second security feature comprises irradiating the mailpiece with light and detecting superfluorescence caused by the irradiating light;

if a second security feature is present, stamping and conveying the mailpieces into a compartment for permissible mailpieces; and, rejecting and conveying remaining mailpieces into a compartment for impermissible mailpieces.

2. The method according to claim 1, comprising further checking the mailpiece if the graphic information does not match a stored depiction of postage indicia.

3. The method according to claim 1, comprising further checking the mailpiece if the graphic information matches a stored depiction of postage indicia.

4. The method according to claim 3, comprising subjecting the mailpiece to a checking routine that differs from the further checking if the graphic information does not match a stored depiction of a stamp.

5. The process according to claim 1, comprising checking whether the irradiating with light takes place in the selected reading area.

6. The method according to claim 1, comprising detecting whether the irradiating with light has caused fluorescence.

7. The method according to claim 1, comprising detecting the graphic information in the selected reading area with a sensor.

8. The method according to claim 1, comprising detecting the graphic information with a camera.

9. The method according to claim 1, comprising storing the graphic representations of postage indicia in the memory of a data processing unit before detecting the graphic information.

10. The method according to claim 1, wherein the additional mailpieces rejected from the device and conveyed into a compartment for impermissible mailpieces are mailpieces that contain no symbols.

* * * * *